(12) United States Patent
Coral

(10) Patent No.: US 6,413,158 B1
(45) Date of Patent: Jul. 2, 2002

(54) ALL-PURPOSE CONDUIT FOR CONVEYING HARMFUL FUMES OR GASES AWAY FROM A WORK STATION

(76) Inventor: Luciano Coral, Leini' (IT)

( * ) Notice: Subject to any disclaimer, the term of this patent is extended or adjusted under 35 U.S.C. 154(b) by 0 days.

(21) Appl. No.: 09/380,468

(22) PCT Filed: Nov. 20, 1997

(86) PCT No.: PCT/IT97/00289

§ 371 (c)(1),
(2), (4) Date: Sep. 3, 1999

(87) PCT Pub. No.: WO98/39112

PCT Pub. Date: Sep. 11, 1998

(30) Foreign Application Priority Data

Mar. 4, 1997 (IT) .......................... TO97A0178

(51) Int. Cl.[7] .............................................. B08B 15/04
(52) U.S. Cl. ........................ 454/65; 285/184; 285/226
(58) Field of Search ..................... 454/65, 63; 285/184, 285/226

(56) References Cited

U.S. PATENT DOCUMENTS

| | | | |
|---|---|---|---|
| 906,874 A | * | 12/1908 | Hallowell |
| 4,082,244 A | * | 4/1978 | Groff |
| 4,158,462 A | | 6/1979 | Coral |
| 4,540,202 A | | 9/1985 | Amphoux et al. |
| 4,591,122 A | * | 5/1986 | Kreuzer |

FOREIGN PATENT DOCUMENTS

| | | | | |
|---|---|---|---|---|
| DE | 32 25 953 | * | 1/1984 | ................ 454/65 |
| DE | 33 41 239 | | 5/1985 | |
| GB | 659561 | | 10/1951 | |

* cited by examiner

*Primary Examiner*—Harold Joyce
(74) *Attorney, Agent, or Firm*—Finnegan, Henderson, Farabow, Garrett & Dunner, L.L.P.

(57) ABSTRACT

The conduit (5) includes a rotary fitting (11), and two segments (18, 19) elbow-connected to each other and each having an articulated mechanism (23, 24) including a pair of U-section bars (26, 27) connected to each other in the form of an articulated parallelogram by means of two articulated elements (37, 44; 44, 51). A spiral compression spring (35, 36) is housed between each pair of bars (26, 27), and is compressed between a disk (55), integral with one of the bars (26, 27), and a flange (64) sliding along a threaded rod (62). The flange (64) is locked on the rod (62) by means of a nut (67), and the rod (62) is connected to a lever member (69) pivoting on one of the articulated elements (37, 44) so as to adjust the action of the spring (35, 36) as a function of the angular position of the relative segment (18, 19) with respect to the articulated element (37, 44).

25 Claims, 5 Drawing Sheets

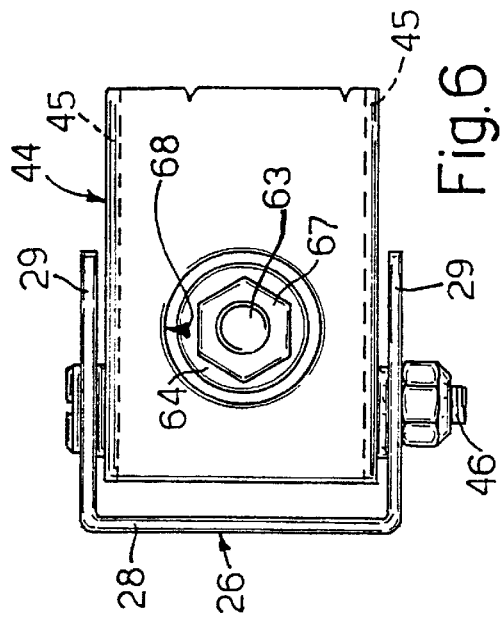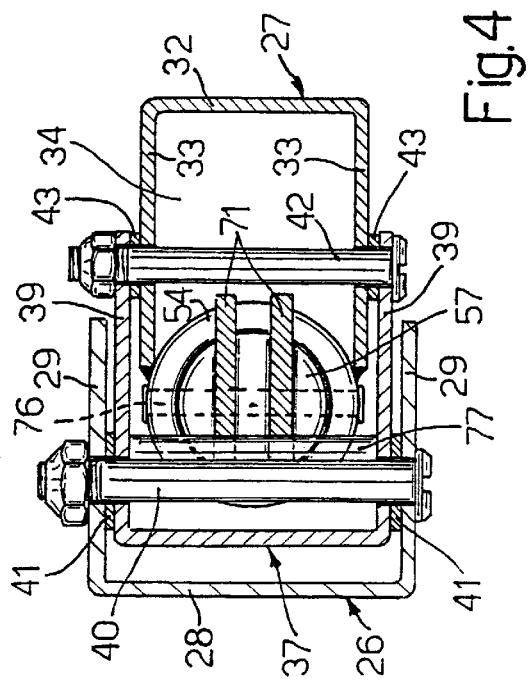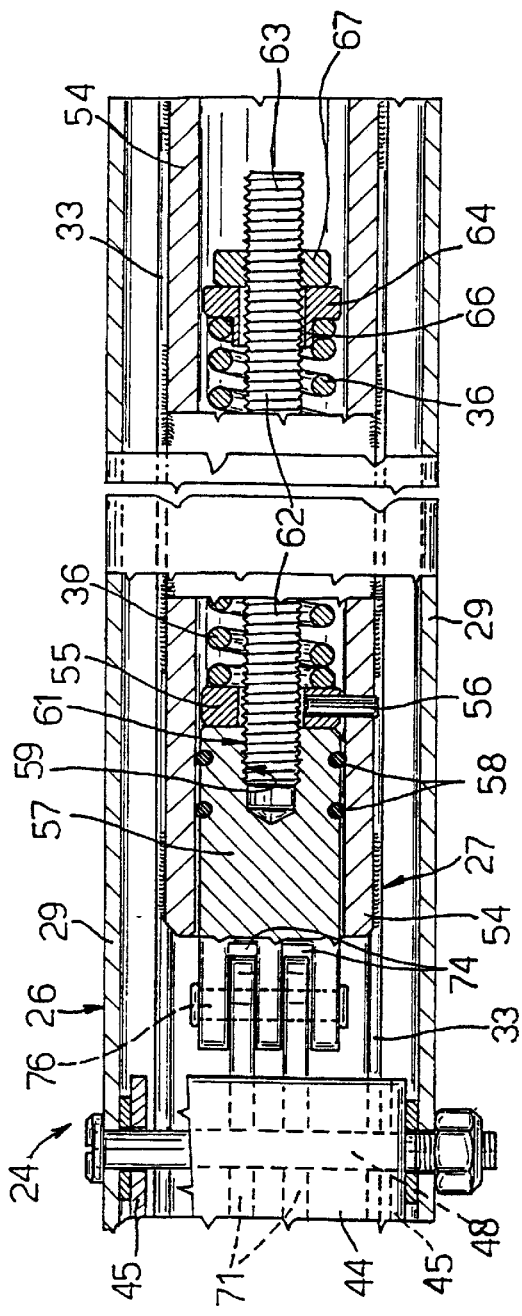

ALL-PURPOSE CONDUIT FOR CONVEYING HARMFUL FUMES OR GASES AWAY FROM A WORK STATION

TECHNICAL FIELD

The present invention relates to an all-purpose conduit for conveying harmful fumes or gases away from a work station. More specifically, the present invention relates to a conduit comprising a fitting between an aspirator and a flexible conduit portion, and wherein the fitting rotates about its own axis to permit both radial and angular movement of a conveying element about the same axis.

BACKGROUND ART

Various conduits of the above type are known. In one, a long flexible conduit is provided between the fitting and the conveying element, and houses an articulated mechanism enabling the conduit to bend substantially at the center line; and the mechanism comprises a pair of spiral tension springs also housed inside the conduit and acting between an articulated plate and two opposite points of the mechanism. A major drawback of this type of conduit is the rapid deterioration caused by particles of the fumes depositing on the mechanism and springs.

Another known conduit features two rigid conduit segments, one of which is connected to the fitting at the top by means of a first flexible conduit portion; a second flexible conduit portion is fitted between the two rigid segments; the articulated connections between the fitting and the rigid segment and between the two rigid segments are made by means of pairs of hinged forks; high-friction disks are inserted between the arms of the forks; and spiral tension springs are inserted between the fitting and an intermediate point on the outside of the conduit.

A major drawback of this type of conduit is the considerable force required to overcome the friction of the disks to move the conveying element. Moreover, the springs, being external, are subject to fouling, and are released when struck accidentally; and, being a safety hazard, both the springs and forks should be shielded, thus increasing the cost of the conduit.

DISCLOSURE OF INVENTION

It is an object of the present invention to provide a highly straightforward, reliable conduit for conveying harmful fumes or gases, designed to overcome the aforementioned drawbacks typically associated with known conduits.

According to the present invention, there is provided an all-purpose conduit for conveying harmful fumes or gases away from a work station, and comprising a fitting between an aspirator and a flexible conduit portion, said fitting rotating about its own axis; at least one conduit segment connected to said flexible conduit portion; an articulated mechanism for varying the angular position of said conduit segment with respect to said fitting; and balancing spring means; characterized in that said mechanism comprises a pair of bars connected to each other in the form of an articulated parallelogram and forming a substantially closed channel; said spring means comprising a spiral compression spring housed in said channel and so connected as to function variously according to the angular position of said conduit segment with respect to said fitting.

BRIEF DESCRIPTION OF DRAWINGS

Two preferred, non-limiting embodiments of the present invention will be described by way of example with reference to the accompanying drawings, in which:

FIG. 4 shows a section along line IV—IV in FIG. 3;

FIG. 5 shows a larger-scale section along line V—V in FIG. 2, in a different operating position;

FIG. 6 shows a partial, larger-scale view along line VI—VI in FIG. 2;

BEST MODE OF CARRYING OUT THE INVENTION

Figure 1:
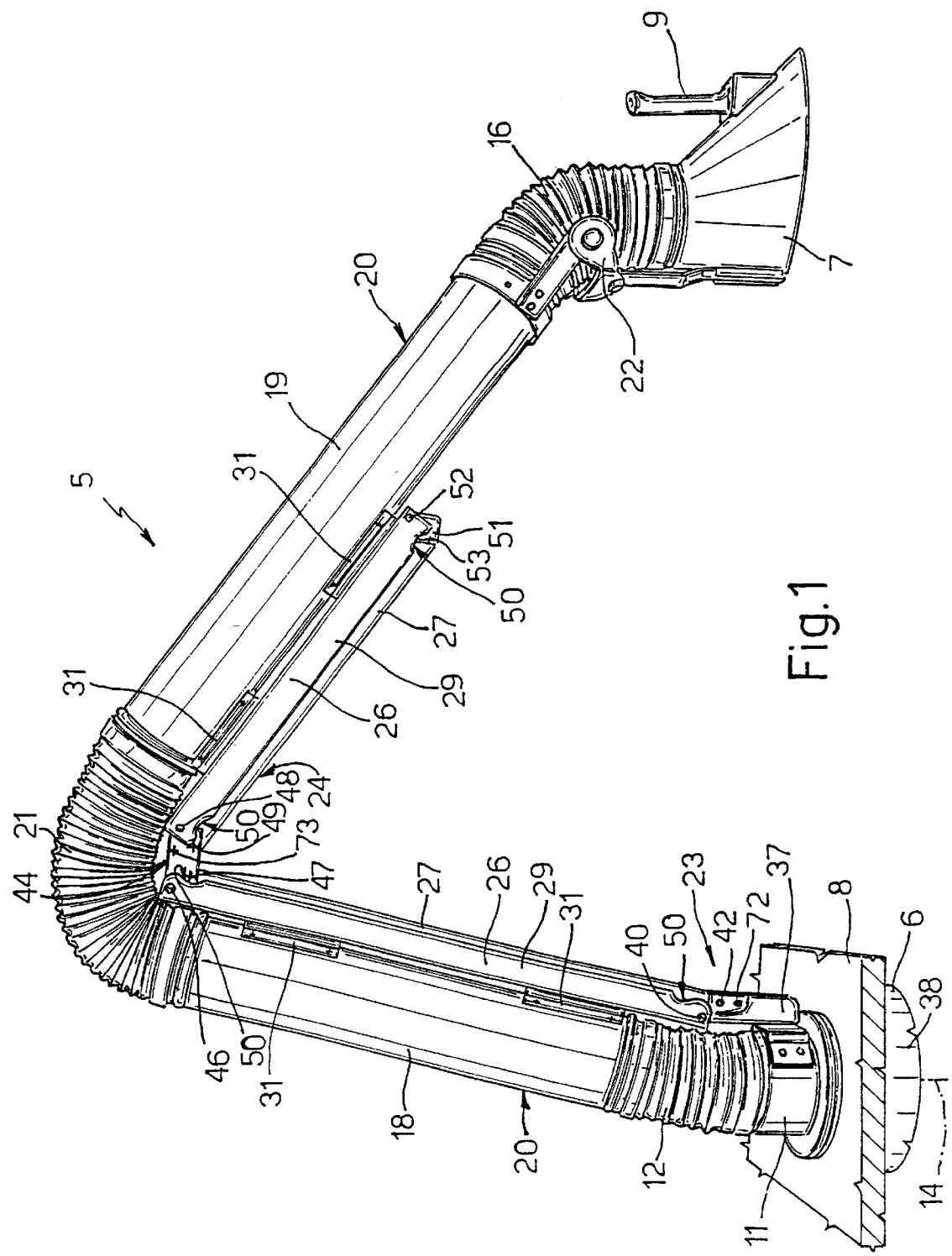
FIG. 1 shows a view in perspective of a first embodiment of an all-purpose conduit for conveying harmful fumes or gases away from an industrial work station, in accordance with the present invention.

Number 5 in FIG. 1 indicates as a whole a conduit: for conveying harmful fumes or gases away from an industrial or nonindustrial work station. Conduit 5 is preferably of circular section, and connects an electric-motor-powered aspirator 6 to a fume conveying element acting as a suction hood 7.

Aspirator 6 is normally fitted beneath a fixed or trolley-mounted support 8, e.g. a horizontal support substantially on a level with the work station. from which the fumes are to be conveyed; and hood 7 is movable for positioning directly over the region in which the fumes are produced, is normally made of plastic material, is truncated-cone-shaped with an axis inclined with respect to the two parallel ends, and comprises a grip 9.

Conduit 5 comprises an annular fitting 11 between aspirator 6 and a known bellows type flexible portion 12 of conduit 5; fitting 11 is connected to aspirator 6 by means of a rolling bearing (not shown) so as to rotate about its own axis 14; and another bellows type flexible portion 16 of conduit 5 is fitted rigidly to the top edge of hood 7.

Flexible portions 12 and 16 are connected respectively to the ends of two preferably straight, and therefore cylindrical, segments 18 and 19 of conduit 5; segments 18 and 19 are elbow-connected to each other by a further bellows type flexible portion 21; a known hinge bracket 22 is fitted between segment 19 and hood 7 to curve flexible portion 16; a first articulated mechanism 23 is provided to adjust the angular position of segment 18 with respect to fitting 11; and, similarly, a second articulated mechanism 24 is provided to adjust the angular position of segment 19 with respect to segment 18.

Figure 2:
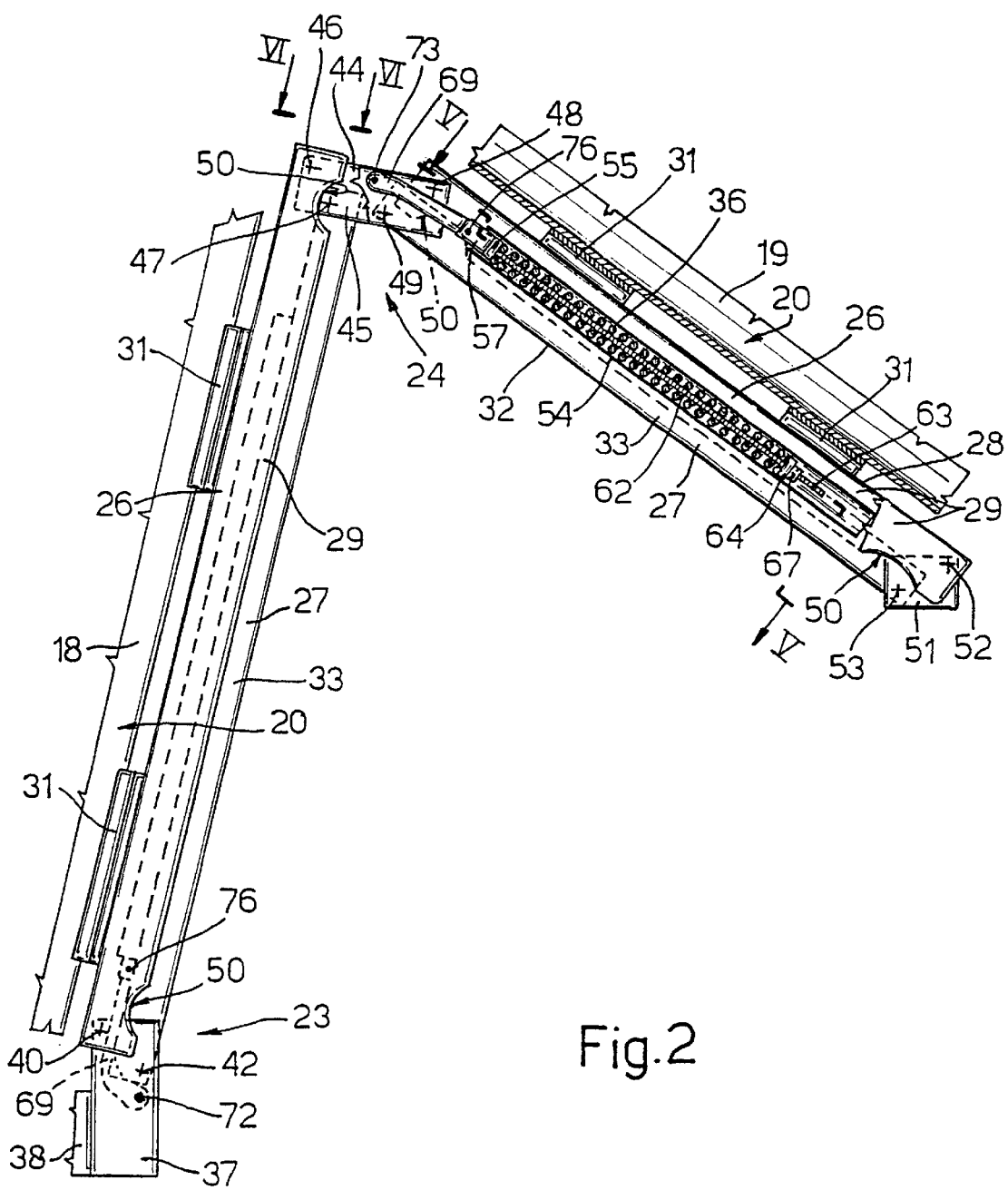
FIG. 2 shows a schematic, partially sectioned vertical view of the articulated mechanisms of the FIG. 1 conduit.

Segments 18 and 19 may be either rigid or limp; mechanisms 23 and 24 may be located inside or outside conduit 5; and, in the FIG. 1 and 2 embodiment, segments 18 and, 19 have a rigid, cylindrical wall 20.

According to the invention, each mechanism 23, 24 comprises a pair of bars 26 and 27 (FIG. 2) connected to each other in the form of an articulated parallelogram; bar 26 has a U-shaped section with a rib 28 (see also FIG. 4) and two parallel wings 29; and rib 28 of bar 26 is fitted to the outside of relative segment 18, 19 by means of at least two fastening elements or brackets 31. More specifically, rib 28 may be pinned, riveted or welded to brackets 31, which in turn are pinned, riveted or welded along the bottom generating line in the vertical diametrical plane of relative segment 18, 19.

Bar 27 is also U-shaped with a rib 32 and two parallel wings 33 closer together than wings 29; bar 27 is positioned opposite bar 26, with wings 33 inserted between wings 29 to form a substantially closed channel 34; and the two channels 34 of mechanisms 23 and 24 house respective compression springs 35 (FIG. 3) and 36 (FIG. 5) described in detail later on.

Each mechanism 23, 24 comprises two articulated elements for parallelogram-connecting bars 26 and 27. One of the two articulated elements of mechanism 23 (FIGS. 1 and 3) comprises a U-shaped section 37 fixed by a bracket 38 to fitting 11, and having two wings 39 (see also FIG. 4) spaced so as to fit between wings 29 of bar 26 and wings 33 of bar 27.

A pin 40 is fitted close to the ends of wings 29 of bar 26 adjacent to section 37, and extends through two spacer washers 41 and two holes formed in wings 39 of section 37, so that bar 26 is connected in articulated manner to section 37. Similarly, a further pin 42 is fitted to wings 39 of section 37, and extends through a further two spacer washers 43 and two holes formed: in the ends of wings 33 of bar 27, which is therefore also connected in articulated manner to section 37.

The second articulated element of mechanism 23 comprises a further U-shaped section 44 (FIG. 2) having two wings 45 the same distance apart as the wings of section 37, and which, in the same way as pins 40 and 42, are connected in articulated manner, by means of a further two pins 46 and 47, to the other ends of wings 29 and 33 of bars 26 and 27. Pins 40 and 42 are so located that the respective axes lie in a plane P (FIG. 3) inclined, in the example shown, at a 45° angle with respect to axis 14 of fitting 11; and pins 46 and 47 obviously lie in a plane parallel to plane P.

One of the two articulated elements of mechanism 24 (FIG. 2) comprises the same section 44, the wings 45 of which are connected in articulated manner to the ends of wings 29 and 33 of relative bars 26 and 27 by means of a further two pins 48 and 49, so that section 44 defines an articulated element common to both mechanisms 23 and 24, which are thus self-supporting. Pins 46–49 are arranged in the form of a trapezium with the longer side at the top.

The second articulated element of mechanism 24 comprises a third U-shaped section 51, which, by means of two pins 52 and 53, is only connected in articulated manner to the other ends of wings 29 and 33 of bars 26 and 27. At each end, the wings 29 of bars 26 of both mechanisms 23 and 24 comprise a cavity 50 to enable bars 26 to rotate with respect to sections 37, 44, 51 without interfering with the ends of respective pins 42, 47, 49, 53.

The edges of wings 33 of bar 27 of each mechanism 23, 24 :are welded with a respective metal tube 54 (FIGS. 2–5) in which respective spring 35, 36 is inserted; and, at a given distance from the end of bar. 27 adjacent to section 37 (mechanism 23) and section 44 (mechanism 24), tube 54 is fitted inside with a stop for arresting spring 35, 36, and which comprises a disk 55 having a hole and secured to tube 54 by means of a radial screw or pin 56.

A member comprising a piston 57 slides inside the portion of tube 54 adjacent to section 37, 44, and comprises two annular grooves housing two piston rings 58 made of low-friction material for guiding piston 57 smoothly along tube 54. Each piston 57 comprises a threaded hole 59 engaged by a threaded end 61 of a rod 62 about which respective spring 35, 36 is wound.

The other end 63 of rod 62 is fitted with a second stop for arresting respective spring 35, 36, and which comprises a flange 64 of a sleeve 66 sliding freely along rod 62. End 63 is also threaded, and is engaged by a nut 67 for locking flange 64 in opposition to the action of spring 35, 36. As shown in FIGS. 2 and 5, rod 62 may advantageously be threaded along its whole length to integrate both ends 61 and 63.

Each nut 67 is screwed adjustably to end 63 of rod 62 to adjust the preload of respective spring 35, 36; for which purpose, the rib of section 44 comprises a hole or cavity 68 (FIG. 6) and the rib of section 51 (FIG. 2) comprises a similar cavity enabling access to each nut 67 by a wrench. The preload of each spring 35, 36 is adjusted accurately by means of respective nut 67, so as to balance the action of springs 35 and 36 and minimize the effort required on the part of the operator to move hood 7 along the work table.

As each mechanism 23, 24 rotates on the respective first articulated element defined by section 37, 44, the tension of each spring 35, 36 is varied by a respective lever member 69. More specifically, each lever member 69 comprises two similar parallel levers 71 (FIGS. 4 and 5) pivoting about a pin 72 (FIG. 2) fitted to wings 39 of section 37 in the case of mechanism 23, and about a pin 73 fitted to wings 45 of section 44 in the case of mechanism 24.

Figure 3:
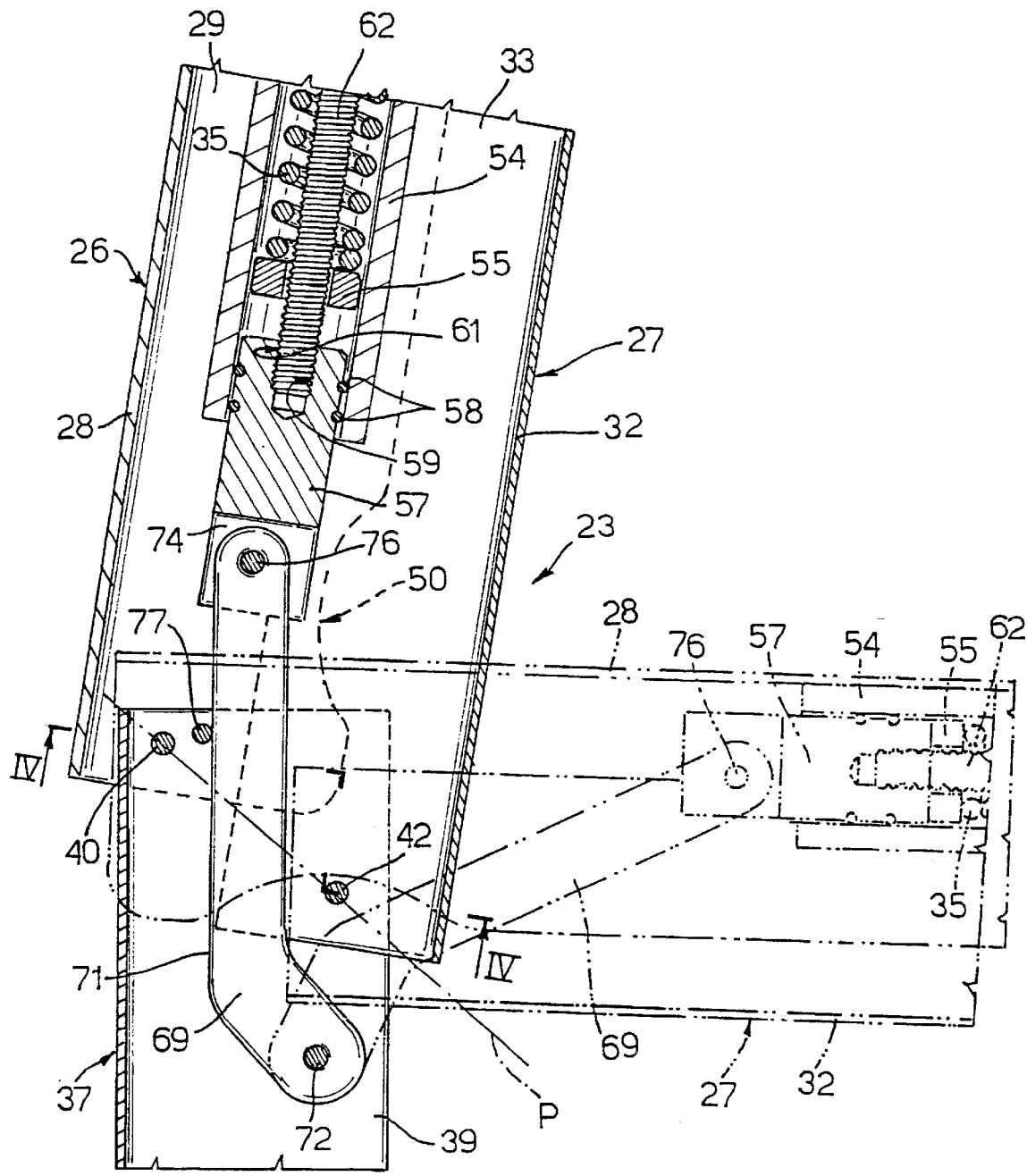
FIG. 3 shows a larger-scale vertical section of a portion of FIG. 2.

The ends of each pair of levers 71 are housed inside two parallel slots 74 (FIG. 5) at the outward end of respective piston 57; the two levers 71 are hinged to said end of piston 57 by means of a further pin 76; and each section 37, 44 comprises a pin 77 (FIG. 3) against which each pair of levers 71 is arrested in the limit position shown in FIGS. 2 and 3.

Pins 72 and 73 in respective sections 37 and 44 are located further away from respective second stops 64 than respective pins 40, 42 and 48, 49, and are therefore eccentric with respect to pins 42 and 49 of bars 27. Consequently, when each pair of levers 71 is rotated from the limit position against respective pin 77, respective piston 57 moves closer to disk 55 to reduce the preload of respective spring 35, 36. Disk 55 therefore defines the other limit stop when rotating levers 71, and hence respective mechanism 23, 24, into the bent position shown by the dot-and-dash line in FIG. 3 and in FIG. 5.

Conduit 5 as described operates as follows.

Using grip 9, the operator can move hood 7 angularly about axis 14, by rotating fitting 11 on its bearing, or along the work table, or vertically towards the source of fumes or gas for removal. More specifically, commencing from the FIG. 1 and 2 position, hood 7 is moved away from fitting 11 by bending: mechanism 23, and hence rigid segment 18 of conduit 5, with respect to section 37 and fitting 11, and is moved towards fitting 11 by bending mechanism 24 with respect to section 44.

Positioning hood 7, however, normally involves moving it both vertically and radially by rotating one or both of mechanisms 23, 24 with respect to sections 37, 44. By virtue of the articulated parallelogram connection of each pair of bars 26, 27, rotation of mechanism 23 causes common section 44 to move parallel to itself, so that both mechanism 24 and segment 19 also move parallel to themselves; and, similarly, rotation of mechanism 24 with respect to section 44 causes section 51 to move parallel to itself. Finally, by appropriately bending bracket 22, hood 7 is rotated to position the bottom edge of the hood as required with respect to the table of the work station.

Figure 7:
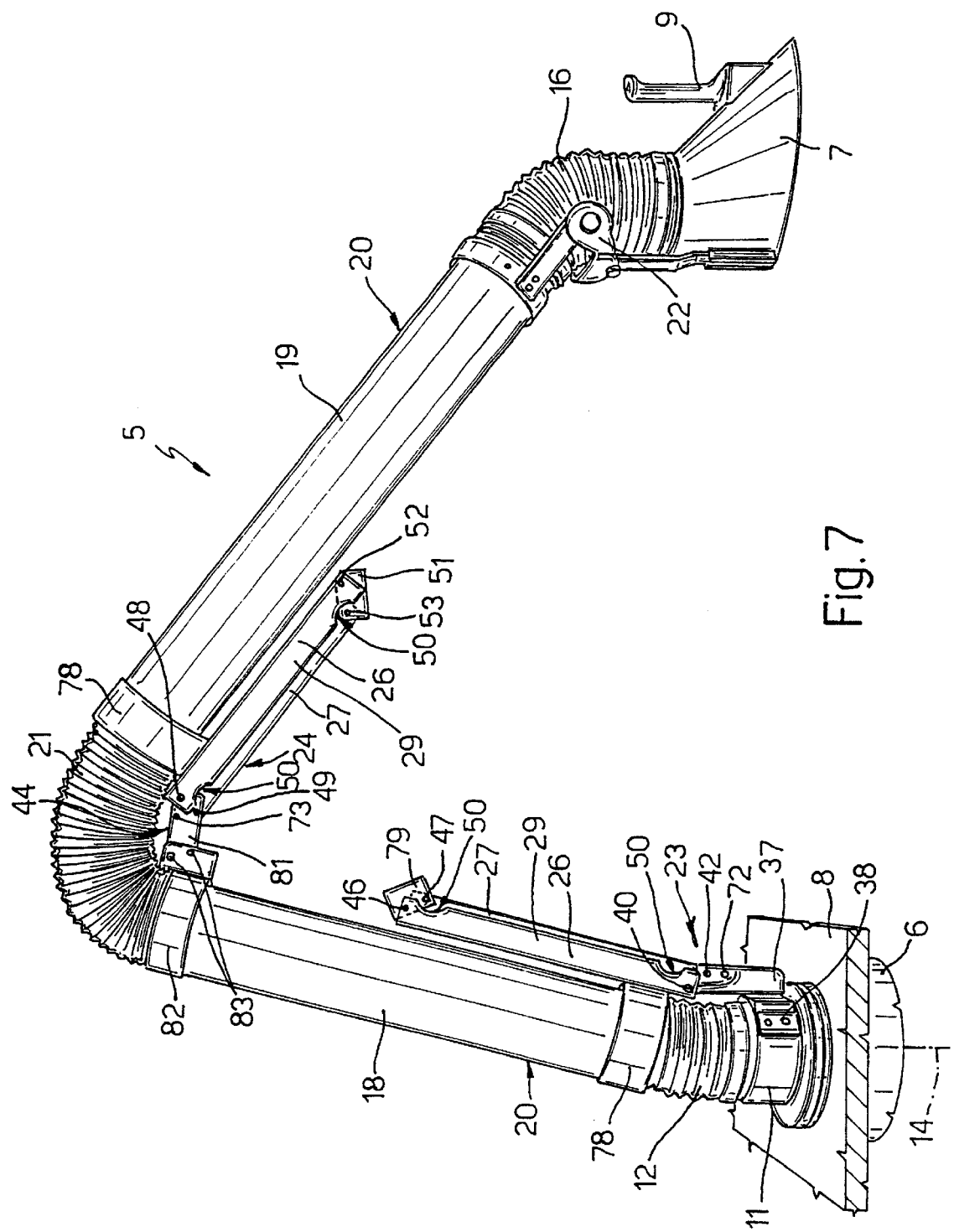
FIG. 7 shows a view in perspective of a further embodiment of an all-purpose conduit for conveying harmful fumes or gases, in accordance with the present invention.

In the FIG. 7 embodiment, in which any parts similar to those in FIG. 1 are indicated using the same numbering system, segments 18 and 19 again comprise a rigid wall 20; and mechanisms 23 and 24 are again defined by a pair of U-section bars 26, 27 between which respective spring 35, 36 is inserted (see also FIGS. 3–5), but in this case are shorter and are not connected directly to each other.

More specifically, bar 26 of each mechanism 23, 24 is fitted, e.g. welded or pinned, to an annular bracket 78 in turn fitted in any known manner to the end of the corresponding segment 18, 19; bars 26 and 27 of mechanism 23 are connected in the form of an articulated parallelogram to articulated element 37 and to a second articulated element defined by a further U-shaped section 79; and section 79 is connected by pins 46 and 47 to bars 26 and 27 only, and comprises a hole or cavity similar to that of section 51.

Bars 26 and 27 of mechanism 24 are connected in the form of an articulated parallelogram to an articulated element defined by a further U-shaped section 81, which is separate from section 79 and is fitted rigidly, e.g. by means of two pins 83, to a further annular bracket 82 fitted in any known manner to the end of segment 18 adjacent to flexible portion 21; and bars 26 and 27 of mechanism 24 are connected to section 51 in the same way as mechanism 24 in FIG. 1.

When the FIG. 7 segment 18 is rotated together with mechanism 23 with respect to section 37, section 81 also rotates integrally with segment 18, so that segment 19 and mechanism 24 also rotate with respect to section 37. Mechanism 24, in turn, may be rotated with respect to section 81 independently of mechanism 23.

In both the FIG. 1 and 7 embodiments, mechanisms 23 and 24 may be housed inside segments 18 and 19 and protected by sealing rings to prevent dust or suspended particles in the fumes from settling inside the mechanisms. If defined by a limp wall, segments 18 and 19 in FIG. 1 are supported by mechanisms 23 and 24, which are self-supporting, and segments 18 and 19 in FIG. 7 may be supported by any known type of supporting structure, possibly inside the segments.

As compared with known conduits, the advantages of the conduit according to the present invention will be clear from the foregoing description. In particular, channel 34 of each mechanism 23, 24 provides for fully protecting both tube 54 and respective balancing spring 35, 36; and the articulated parallelogram connection of bars 26 and 27 provides for stable rotation of mechanisms 23 and 24.

Moreover, rod 62 and nut 67 provide for accurately adjusting the preload of each spring 35, 36 to achieve the best balance; and the connection of rod 62 to levers 71 provides for varying the preload of spring 35, 36 as a function of the bend angle of mechanism 23, 24 with respect to the corresponding articulated element 37, 44, 81.

Clearly, changes may be made to the fume and gas conduits as described and illustrated herein without, however, departing from the scope of the accompanying claims. For example, rod 62 may be threaded at ends 61 and 63 only, as opposed to along its whole length; the angle of plane P with respect to axis 14 may vary according to the type of application; disk 55 may be welded to tube 54 as opposed to using a pin or screw; and flange 64 may be dispensed with, and the spring 35, 36 stop defined by nut 67 itself.

Moreover, bars 26 and 27 may have a curved as opposed to a U-shaped section; lever member 69 may be defined by only one lever 71 and/or the wings of one or more of sections 37, 44, 51, 79, 81 may be located outwards of those of bars 26; and fitting 11 may be ceiling-mounted, may be fitted to a support at a higher level than the work station, and may be connected to a centralized suction system as opposed to directly to a single aspirator.

What is claimed is:

1. An all-purpose conduit for conveying harmful fumes or gases away from a work station, comprising:

a fitting for connection to a flexible conduit portion, said fitting rotating about its own axis;

at least one conduit segment connected to said flexible conduit portion;

an articulated mechanism for varying an angular position of said conduit segment with respect to said fitting; and balancing spring means, wherein said articulated mechanism comprises a pair of bars connected to form an articulated parallelogram and forming a substantially closed channel, and wherein said spring means comprises a spiral compression spring housed in said channel and so connected as to function variously according to the angular position of said conduit segment with respect to said fitting.

2. A conduit as claimed in claim 1, wherein said conduit segment may be rigid or limp and said articulated mechanism is located inside or outside said conduit segment.

3. A conduit as claimed in claim 2, wherein said pair of bars comprises a first bar having a U-shaped section having a rib fitted to the outside of said conduit segment, and a second bar having a U-shaped section and located opposite said first bar;

wherein wings of said second bar are inserted between wings of said first bar to form said channel, wherein said articulated parallelogram comprises a pair of articulated elements, and wherein a first articulated element in said pair is fixed to said fitting.

4. A conduit as claimed in claim 3, wherein said spring is inserted inside a rigid tube fitted to the wings of said second bar, wherein said spring is compressed between a first stop fixed to said tube, and a second stop, and wherein a lever member, hinged to said first articulated element, is connected to said second stop.

5. A conduit as claimed in claim 4, wherein said second stop is fitted to a rod inserted inside said spring and a sliding member inside said tube is fitted to said rod and hinged to said lever member.

6. A conduit as claimed in claim 5, wherein said rod comprises at least one threaded portion to which is screwed a nut for locking said second stop and adjusting a preload of said spring.

7. A conduit as claimed in claim 4, wherein said lever member pivots about a pin of said lever member so located as to vary a preload of said spring as a function of rotation of said articulated mechanism with respect to said first articulated element.

8. A conduit as claimed in claim 7, wherein said pair of bars is hinged to said first articulated element by two respective pins and the pin of said lever member is located further away from said second stop than each of said two respective pins.

9. A conduit as claimed in claim 6, wherein said first stop comprises a disk having a hole and fixed inside said tube and said second stop comprises a flange for sliding along said rod and for being pushed by said spring against said nut.

10. A conduit as claimed in claim 9, wherein said sliding member comprises a piston having at least two piston rings made of low-friction material for guiding the piston along the inner surface of said tube and said rod has a second threaded portion engaging a threaded hole in said piston.

11. A conduit as claimed in claim 10, wherein said piston is arrested against said disk to define one end of travel of said lever member and said first articulated element comprises a stop defining another end of travel of said lever member.

12. A conduit as claimed in claim 11, wherein said piston terminates outwards of said tube with a pair of slots, wherein said lever member comprises two similar parallel levers inserted inside said slots, and wherein a through pin, perpendicular to said slots, is provided to connect said levers in an articulated manner to said piston.

13. A conduit as claimed in claim 6, wherein each of said pair of articulated elements comprises a U-shaped section, wings of which are inserted between wings of said first bar and said second bar, and the U-shaped section of said first articulated element is fixed to said fitting by a bracket fixed to the outside of said fitting.

14. A conduit as claimed in claim 13, wherein the U-shaped section of said second articulated element comprises a cavity permitting adjustment of said nut on said rod.

15. A conduit as claimed in claim 13, wherein the cross-section of the all-purpose conduit is circular, wherein said conduit segment comprises a rigid, cylindrical wall, and wherein said first bar is fixed to the outside of said conduit segment of at least two elements fixed along a generating line of said cylindrical wall.

16. A conduit as claimed in claim 13, wherein the cross-section of the all-purpose conduit is circular, wherein said at least one conduit segment forms a first conduit segment comprising a rigid, cylindrical wall, and wherein said first bar is fixed to the outside of said first conduit segment, along a generating line of said cylindrical wall, by means of an annular bracket surrounding said cylindrical wall.

17. A conduit as claimed in claim 16, wherein said first conduit segment is connected by a second flexible conduit portion to a second conduit segment, wherein said second conduit segment is provided with a second articulated mechanism and the first articulated mechanism and the second articulated mechanism are similar.

18. A conduit as claimed in claim 17, wherein a pair of bars of said second articulated mechanism is connected in the form of an articulated parallelogram to a first articulated element of the second articulated mechanism and a second articulated element of the second articulated mechanism, and said second articulated element of the second articulated mechanism comprises a cavity permitting adjustment of a respective nut of the second articulated mechanism on a corresponding rod of the second articulated mechanism.

19. A conduit as claimed in claim 17, characterized in that said first articulated mechanism and said second articulated mechanism have a common articulated element, wherein a first bar of the pair of bars of said second articulated mechanism is fixed to said second conduit segment by a corresponding pair of elements, and wherein the second articulated element of said second articulated mechanism is connected to the pair of bars of the second articulated mechanism only.

20. A conduit as claimed in claim 19, wherein the axes of said two respective pins of said first articulated element lie in a plane at a substantially 45° angle with respect to the axis of said fitting, and the respective pins of the respective pairs of bars of said first articulated mechanism and said second articulated mechanism is arranged in the form of a trapezium so as to keep said first conduit segment and said second conduit segment at an angle with respect to each other.

21. A conduit as claimed in claim 17, wherein said first articulated mechanism and said second articulated mechanism are independent of each other, and the first bar of the pair of bars of said second articulated mechanism is fixed to said second conduit segment by means of a respective bracket surrounding the respective cylindrical wall.

22. A conduit as claimed in claim 21, wherein the first articulated element of said second articulated mechanism is fitted to a bracket fitted to one end of said first conduit segment, and the second articulated element of each of said first articulated mechanism and said second articulated mechanism is connected to the respective pair of bars only.

23. A conduit as claimed in claim 17, wherein said second conduit segment is connected to a fume or gas conveying element of a third flexible conduit portion.

24. A conduit as claimed in claim 1, wherein said fitting is connected to an aspirator fitted to a fixed or movable support substantially on a level with or at a lower level than the work station.

25. A conduit as claimed in claim 1, wherein said fitting is ceiling-mounted or fitted to a support at a higher level than said work station.

* * * * *

UNITED STATES PATENT AND TRADEMARK OFFICE
CERTIFICATE OF CORRECTION

PATENT NO. : 6,413,158 B1
DATED : July 2, 2002
INVENTOR(S) : Luciano Coral

It is certified that error appears in the above-identified patent and that said Letters Patent is hereby corrected as shown below:

<u>Title page,</u>
Item [73], Assignee, should be -- Coral S.p.A., Leini (IT). --.

Signed and Sealed this

Thirty-first Day of January, 2006

JON W. DUDAS
*Director of the United States Patent and Trademark Office*